United States Patent
Amerine (10) Patent No.: US 9,389,324 B2
(45) Date of Patent: Jul. 12, 2016

(54) TEMPERATURE COMPENSATION FOR SEISMIC SENSOR AND METHOD

(71) Applicant: SERCEL, INC., Houston, TX (US)

(72) Inventor: Marvin K. Amerine, Lake Jackson, TX (US)

(73) Assignee: SERCEL, INC., Houston, TX (US)

( * ) Notice: Subject to any disclaimer, the term of this patent is extended or adjusted under 35 U.S.C. 154(b) by 538 days.

(21) Appl. No.: 13/950,747

(22) Filed: Jul. 25, 2013

(65) Prior Publication Data
US 2015/0027229 A1    Jan. 29, 2015

(51) Int. Cl.
  *G01V 1/18*  (2006.01)
  *G01V 1/24*  (2006.01)
  *G01V 1/16*  (2006.01)
  *G01V 1/36*  (2006.01)
  *G01D 3/028*  (2006.01)

(52) U.S. Cl.
  CPC  *G01V 1/24* (2013.01); *G01V 1/162* (2013.01); *G01V 1/182* (2013.01); *G01V 1/36* (2013.01); *G01D 3/028* (2013.01); *G01V 2210/27* (2013.01)

(58) Field of Classification Search
  CPC ........... G01V 1/18; G01V 1/182; G01V 1/24; G01V 1/36; G01V 1/162; G01V 2210/28; G01D 3/028
  See application file for complete search history.

(56) References Cited

U.S. PATENT DOCUMENTS

| 4,128,010 | A |   | 12/1978 | Aske | |
|---|---|---|---|---|---|
| 4,334,296 | A | * | 6/1982 | Hall, Jr. | G01V 1/181 367/166 |
| 4,504,932 | A | * | 3/1985 | Sundt | G01V 1/181 367/183 |
| 7,505,369 | B2 | * | 3/2009 | Hagedoorn | G01V 1/162 367/178 |
| 2010/0296366 | A1 | * | 11/2010 | Kamata | G01V 1/164 367/25 |

FOREIGN PATENT DOCUMENTS

| EP | 2 256 520 A2 | 12/2010 |
|---|---|---|
| EP | 2 428 821 A2 | 3/2012 |

OTHER PUBLICATIONS

Office Action in corresponding European Application No. 14 15 0975.2 dated Nov. 17, 2015.

* cited by examiner

*Primary Examiner* — Luke Ratcliffe
*Assistant Examiner* — Hovhannes Baghdasaryan
(74) *Attorney, Agent, or Firm* — Patent Portfolio Builders PLLC (57) ABSTRACT

A seismic sensor detects a characteristic of a medium during a seismic survey. The seismic sensor includes a casing; a magnet located inside the casing; a coil assembly located inside the casing, wherein the coil assembly moves relative to the magnet; and a temperature-sensitive device connected to terminals of the coil assembly and configured to improve the damping. The magnet and the coil assembly produce some intrinsic damping and the additional damping introduced by the temperature-sensitive device is selected to counterbalance the temperature-dependent intrinsic damping so that a phase of a recorded seismic signal is compensated for temperature induced magnetic field changes.

10 Claims, 8 Drawing Sheets

Figure. 7
Fixed Damping Resistor

Figure. 8
Varying Damping

Figure. 9
Variable Damping Resistor

Figure. 10
Compensated Damping

TEMPERATURE COMPENSATION FOR SEISMIC SENSOR AND METHOD

BACKGROUND

1. Technical Field

Embodiments of the subject matter disclosed herein generally relate to sensors for collecting seismic or similar data and, more particularly, to mechanisms and techniques for correcting a temperature-induced phase change of a recording signal during a seismic survey.

2. Discussion of the Background

Seismic data acquisition and processing may be used to generate a profile (image) of the geophysical structure under the ground (either on land or seabed). While this profile does not provide an exact location for oil and gas reservoirs, it suggests, to those trained in the field, the presence or absence of such reservoirs. Thus, providing a high-resolution image of the subsurface of the earth is important, for example, to those who need to determine where oil and gas reservoirs are located.

Figure 1:
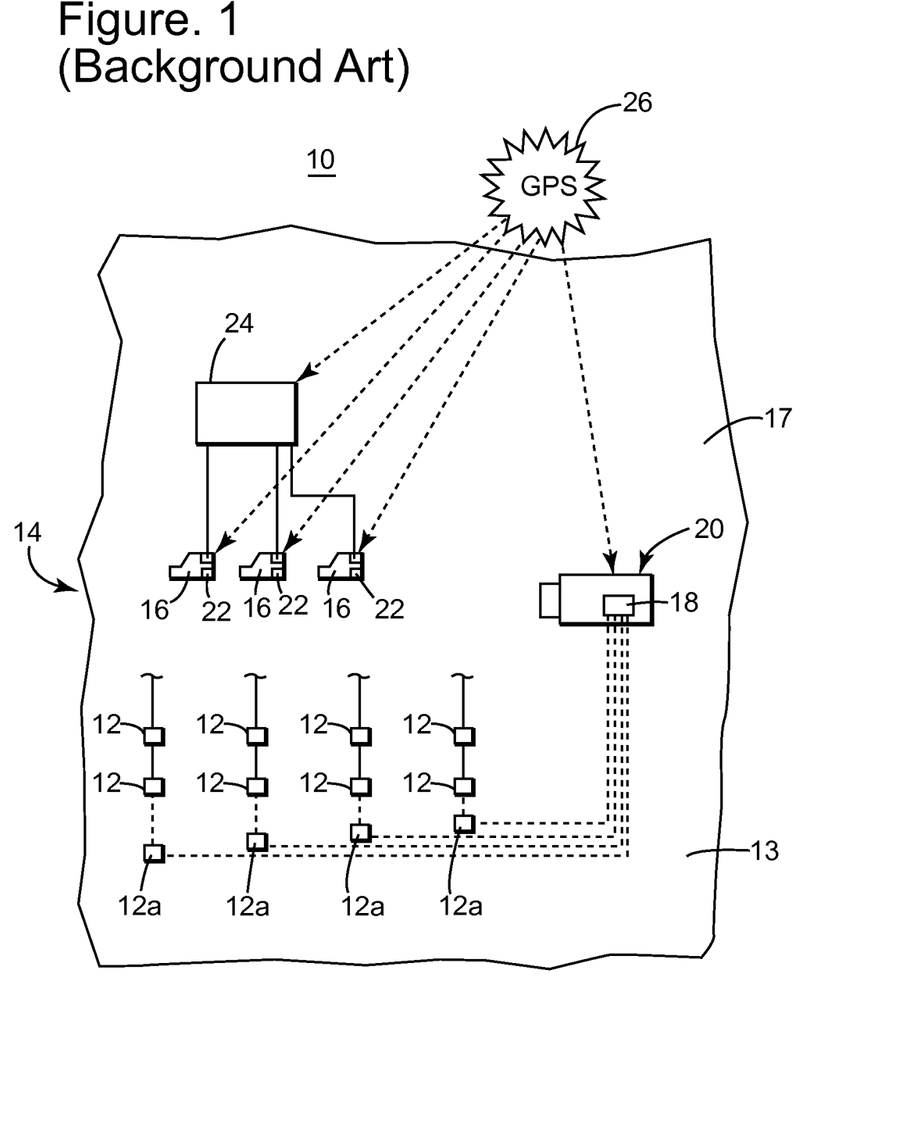
FIG. 1 is a schematic diagram of a possible land seismic survey.

Traditionally, a land seismic survey system 10 is generally configured as illustrated in FIG. 1, although many other configurations are used. System 10 includes plural receivers 12 and acquisition units 12a positioned over an area 13 of a subsurface to be explored and in contact with the surface 14 of the ground. A number of vibroseismic or other types of sources 16 are also placed on surface 14 in an area 17, in a vicinity of area 13 of receivers 12. A recording device 18 is connected to a plurality of receivers 12 and placed, for example, in a station-truck 20. Each source 16 may be composed of a variable number of vibrators or explosive devices, typically between 1 and 5, and may include a local controller 22. A central controller 24 may be present to coordinate the shooting times of the sources 16. A GPS system 26 may be used to time-correlate sources 16 and receivers 12 and/or acquisition units 12a.

With this configuration, sources 16 are controlled to generate seismic waves, and the plurality of receivers 12 record waves reflected by oil and/or gas reservoirs and other structures. The seismic survey may last for days, or it may be repeated at various time intervals, e.g., months or years apart, to determine the original shape or changes in the monitored reservoirs. Either way, daily temperature changes occur during the life of the seismic survey, and they negatively impact the quality of the recorded signals as now discussed.

Figure 2:
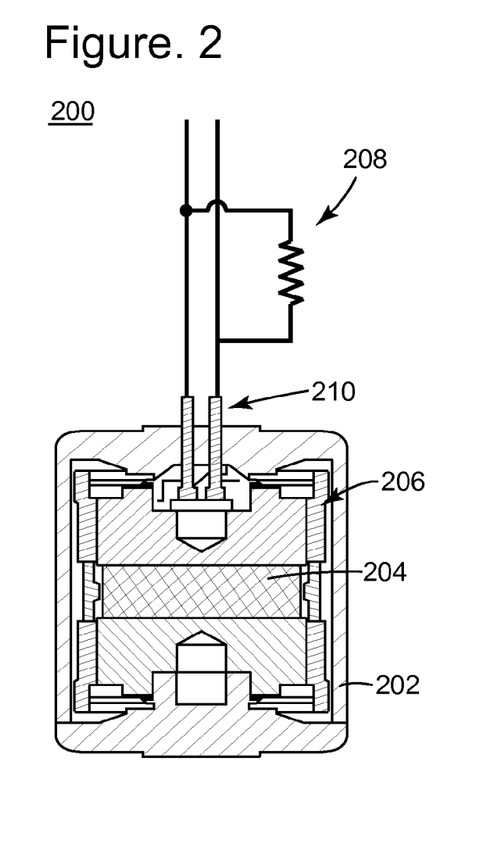
FIG. 2 is a schematic diagram of a conventional geophone with a fixed damping resistor.

Receiver 12 may be a geophone having a structure as illustrated in FIG. 2. This structure may be found in other transducers that transform mechanical energy into electrical energy, i.e., seismometer, or any other device that uses a magnet field for energy conversion. For simplicity, this application refers herein to a geophone, but the novel operation principle described herein also applies for other types of transducers. Geophone 200 has a casing 202 that houses a magnet 204 and a coil assembly 206. Coil assembly 206 is electrically connected to terminals 210, and these terminals may be electrically connected to an optional damping resistor 208. When in use, the casing 202 moves in response to seismic waves in the earth. Either the coil assembly 206 or the magnet 204 is attached to the casing 202 and the mass of the other is suspended in such a way as to cause relative movement between the coil assembly 206 and the magnet 204. This movement of coil assembly 206 relative to magnet 204 produces a back electromagnetic force (emf) in the wires of the coil assembly. When damping resistor 208 is present, the back emf generates a current through terminals 210 and resistor 208. Voltage across terminals 210 is measured and considered to be indicative of the seismic signal to be recorded. Thus, a signal (having an amplitude and a phase) is recorded by the geophone 200 based on the voltage across optional damping resistor 208.

However, the following problem affects recorded signal quality. When ambient temperature of the geophone changes, for example, from 10° C. during the night to more than 40° C. during the day, magnetic properties of the magnet change. Depending on the type of magnet, its field can change more or less with the temperature. The cheaper the magnet, the more significant the magnetic field change. In fact, all magnets, irrespective of their price, experience a magnetic field change with changing ambient temperature.

The change in the magnetic field degrades the quality of recorded seismic signals because a change in the magnetic field determines a change in the electromagnetic damping of the geophone. The concept of electromagnetic damping is now explained. If no damping exists, after casing 200 moves due to seismic waves, coil assembly 206 will move in an oscillatory fashion until its energy is dissipated, e.g., through friction. These oscillatory movements of a second-order system are well-known to someone skilled in the art. The residual oscillations are undesirable because they interfere with recording of later ground motion. Therefore, damping is provided to the coil assembly to limit the number of oscillations, if possible, to one. Two types of damping are present in a geophone. Intrinsic damping is provided by eddy currents that appear in the coil support mechanism, which in turn generate a magnetic field opposing the magnetic field generated by magnet 204. A second type of damping may be provided by adding damping resistor 208, which has a resistance calculated in such a way to optimize the assembly motion.

The calculated value of the damping resistor 208 is only effective for a given temperature. If the ambient temperature of the geophone changes as noted above, there can be no unique match between a fixed resistor and the magnetic field temperature profile. Thus, even with a precision damping resistor 208, the geophone is prone to introducing phase errors into the measured signal when the temperature deviates from the nominal temperature for which the resistance of the damping resistor has been calculated.

Given that for a land seismic survey some geophones may be in full sun and some may be in complete shade, phase errors introduced by the geophones because of variations in their magnetic properties may be significant. For example, it has been observed that two identical geophones simultaneously recording seismic waves, one in shade and one in full sun, recorded the corresponding signals with a phase difference of up to 20 degrees. This large phase difference in recorded signals introduces inaccuracies when the central recording unit or other processing units add together several recorded signals in a process commonly called stacking or utilizes other mathematical processes.

One way to alleviate this problem is to develop magnets that are not temperature-sensitive, i.e., magnets with low thermal coefficients. However, such magnets are expensive and may have their own limitations because any magnet is, to a certain degree, temperature-sensitive. Further, these low-thermal-coefficient magnets have geometric limitations.

Thus, there is a need to develop technologies and methods for compensating temperature-induced magnetic field changes so that the geophones, irrespective of the ambient temperature, record accurate phases of the seismic signals.

SUMMARY OF THE INVENTION

According to an exemplary embodiment, there is a seismic sensor for detecting a characteristic of a medium during a seismic survey. The sensor includes a casing; a magnet located inside the casing; a coil assembly located inside the casing, wherein the coil assembly moves relative to the magnet; and a temperature-sensitive device connected to terminals of the coil assembly and configured to generate a compensated damping. The magnet and the coil assembly produce a temperature-sensitive intrinsic damping and the temperature-sensitive device produces an additional damping that is selected to counterbalance the temperature-sensitive intrinsic damping to obtain a compensated damping that reduces effects of a changing magnetic field so that a phase of a recorded seismic signal is compensated for temperature-induced magnetic field changes.

According to another embodiment, there is a method for detecting a characteristic of a medium during a seismic survey. The method includes placing a seismic sensor on ground, wherein the seismic sensor includes a casing, a magnet located inside the casing, a coil assembly located inside the casing, wherein the coil assembly moves relative to the magnet, and a temperature-sensitive device is connected to terminals of the coil assembly; measuring with the seismic sensor a seismic signal; generating with the magnet and the coil assembly an intrinsic damping; and generating with the temperature-sensitive device an additional damping that together with the intrinsic damping form a compensated damping so that a phase of a recorded seismic signal is compensated for temperature-induced magnetic field changes.

According to still another embodiment, there is a method for adjusting a phase of a seismic signal recorded with a seismic sensor. The method includes receiving magnet characteristics of a magnet that is part of the seismic sensor; receiving the recorded seismic signal; receiving an ambient temperature of the seismic sensor; calculating, in a processor, a new phase for the recorded seismic sensor based on the magnet characteristics, the recorded seismic signal and the ambient temperature; and replacing an original phase of the recorded seismic signal with the new phase.

According to yet another embodiment, there is a seismic survey system configured to adjust a phase of a recorded seismic signal. The system includes plural seismic sensors configured to record seismic signals; plural remote acquisition units or base stations configured to receive the seismic signals from the plural seismic sensors; and a processor. The processor is configured to receive magnet characteristics of a magnet that is part of a given seismic sensor, receive the recorded seismic signal associated with given seismic sensor, receive an ambient temperature of the given seismic sensor, calculate a new phase for the recorded seismic signal based on the magnet characteristics, the recorded seismic signal and the ambient temperature, and replace an original phase of the recorded seismic signal with the new phase.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a geophone. However, the embodiments to be discussed next are not limited to geophones but may be applied to other sensors that use a magnetic field to transform mechanical energy into electrical energy.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a seismic or other type of vibration sensor for detecting a characteristic of a medium during a seismic survey. The seismic sensor includes a casing, a magnet located inside the casing, a coil assembly located inside the casing, and a temperature-sensitive device connected to terminals of the coil assembly and configured to optimize damping. The magnet and coil assembly produce intrinsic damping which changes with temperature. The temperature-sensitive device is selected to counterbalance the temperature effects of the intrinsic damping so that the phase of a recorded seismic signal is compensated for the temperature-induced magnetic field changes.

Figure 3:
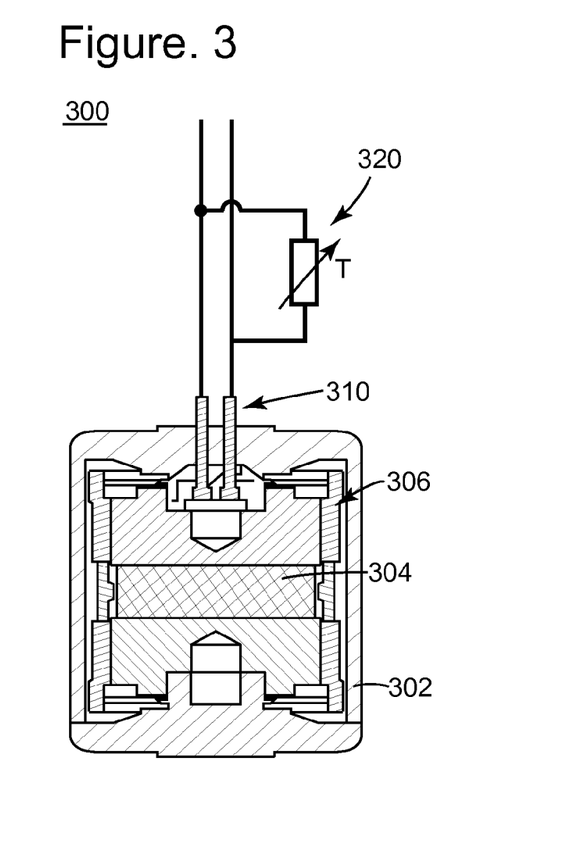
FIG. 3 is a schematic diagram of a geophone with a variable damping resistor according to an exemplary embodiment.

A novel geophone 300 that achieves a more temperature-constant electromagnetic damping is illustrated in FIG. 3. Geophone 300 has a casing 302 in which a magnet 304 and a coil assembly 306 are housed. The magnet and the coil assembly are configured to move relative to each other, thus, producing a back emf at terminals 310. Instead of connecting a fixed damping resistor to terminals 310, as illustrated in FIG. 2, the novel geophone has a temperature-sensitive unit 320 that provides a near-constant electromagnetic damping. This near-constant electromagnetic damping is achieved as discussed next.

Figure 4:
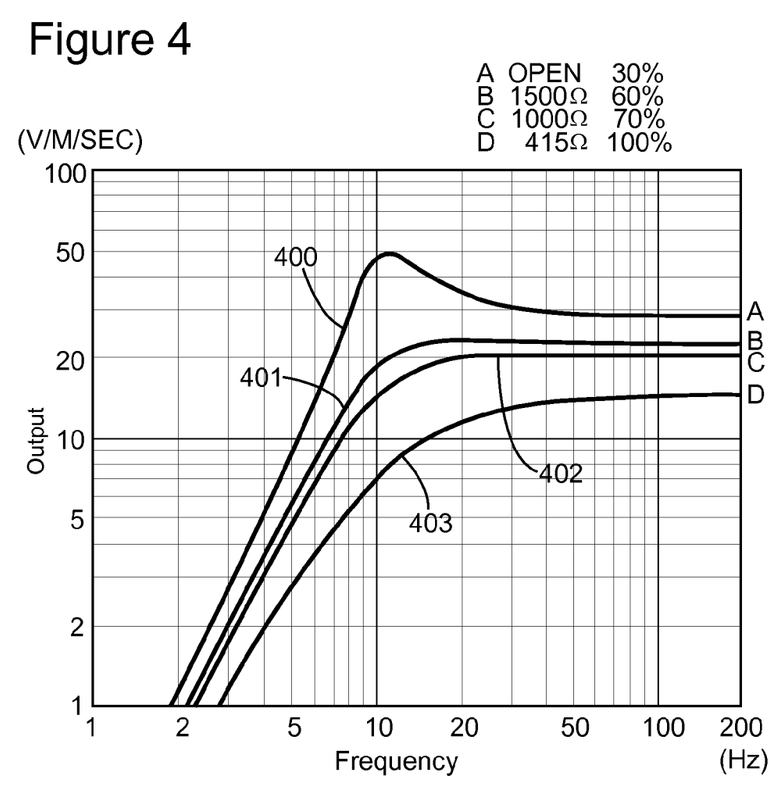
FIG. 4 is a graph illustrating the frequency response of a geophone with various amounts of damping.

FIG. 4 shows the frequency response of a typical geophone at a nominal temperature Tn with several different damping resistors. Less damping causes a higher peak in the frequency domain which means more cycles of oscillation in the time domain. Curve 400 shows the frequency response of a certain geophone with no damping resistance added. This demonstrates the undesired effect of a peaking resonance at approximately 10 Hz. There is an intrinsic damping of zeta=30% for this particular geophone. Curve 401 shows the frequency response of the geophone with a damping resistance of 1500 ohms that yields damping of zeta=60% demonstrating the improvement of adding a damping resistor. Curve 402 shows the frequency response of the geophone with a damping resistance of 1000 ohms that yields a damping of zeta=70% demonstrating an optimal damping with the lowest frequencies almost no peaking. Curve 403 shows the frequency response of the geophone with a damping resistor of 415 ohms that yields a critical damping of zeta=100% which totally eliminates peaking but causes a smaller output at lower frequencies. 70% damping is frequently chosen as a reasonable compromise between achieving good low-frequency response and minimizing oscillations and will be used in these descriptions as desirable damping for all conditions. There can be many good reasons for choosing a different desirable amount of damping.

This frequency response will change when the ambient temperature deviates from Tn primarily due to the magnetic field strength changing with temperature but also due to other temperature sensitive characteristics.

Figure 5:
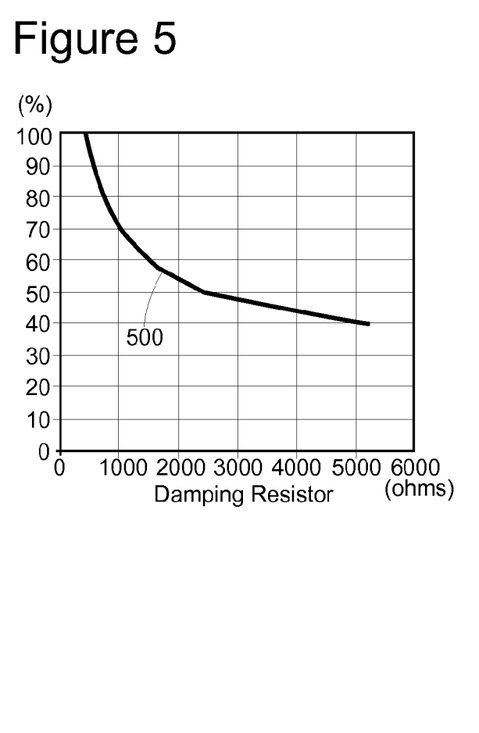
FIG. 5 is a graph illustrating the relationship between the value of the damping resistor and the amount of damping.

FIG. 5 shows a plot of the damping of this typical geophone with a change in damping resistance. It clearly shows a generally negative slope. Thus, the damping of this typical geophone can be changed over a large range by selecting an appropriate damping resistor. Curve 500 shows that increasing the damping resistance will decrease the damping for this particular geophone.

Figure 6:
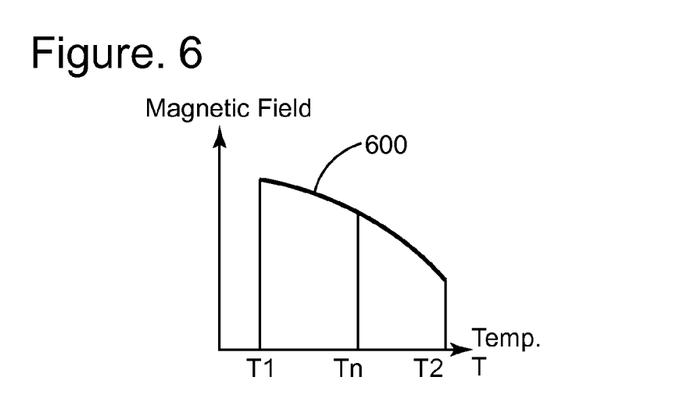
FIG. 6 is a graph illustrating a normal change in a magnetic field with temperature.

FIG. 6 illustrates a curve 600 corresponding to the variation of a magnetic field B generated by a magnet as a function of the ambient temperature T. The curve is plotted between temperatures T1 and T2, which determine a temperature range of interest for the geophones. The geophone is traditionally designed to work for a nominal temperature Tn, i.e., resistor 208 in FIG. 2 is calculated to obtain a desired damping (e.g., Ro yields a damping of zeta=70%) at the nominal temperature Tn. Curve 600 may vary for different magnets, but the illustrated profile is considered a good approximation for many existing magnets.

Figure 7:
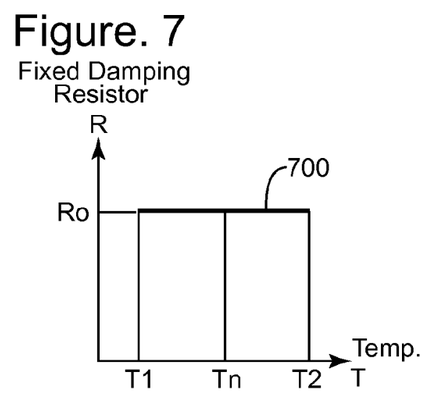
FIG. 7 is a graph illustrating the temperature characteristics of a traditional fixed resistor with a value Ro designed to yield a desired 70% damping at a nominal temperature Tn.
Figure 8:
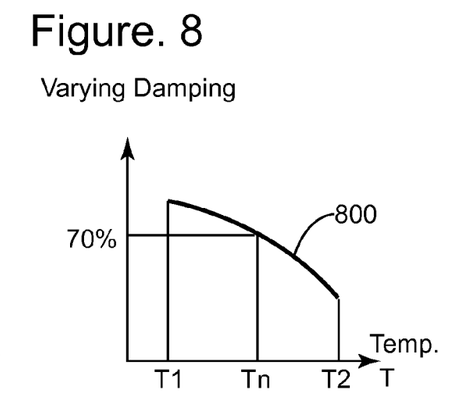
FIG. 8 is a graph illustrating a large change in damping with temperature resulting from using the fixed resistor Ro.

The traditional fixed damping resistor has a relatively constant value of Ro at all temperatures. Curve 700 is actually shown as a straight line in FIG. 7. The damping associated with varying magnetic field B and the traditional fixed resistor Ro is shown as curve 800 in FIG. 8. The damping associated with a traditional resistor (e.g., resistor 208) deviates from the desired damping at Tn as the temperature deviates from Tn because the magnetic field B has changed with temperature without a commensurate change in damping resistor. Thus, the total damping, illustrated as curve 800 in FIG. 8, shows a variation over the range of interest T1 to T2, resulting in signal degradation (i.e., phase modifications) as the temperature of the sensor deviates from the nominal temperature Tn.

Figure 9:
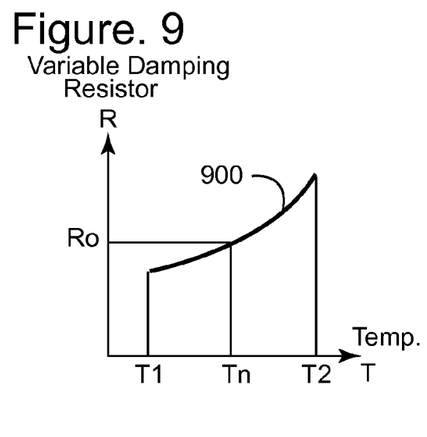
FIG. 9 is a graph illustrating the desired change in resistance of a temperature-sensitive device or collection of devices with temperature.

According to the embodiment illustrated in FIG. 3, the temperature-sensitive device (see element 320 in FIG. 3) may be designed in such a way that its resistance changes with temperature as illustrated by curve 900 in FIG. 9. The shape of curve 900 is chosen to counteract the effects of the change in damping in curve 800 due to the change in magnetic field in curve 600 as closely as possible. The resulting damping at any given temperature in a given range, which is illustrated as curve 1000 in FIG. 10, results in damping that is substantially flat with temperature. In other words, magnet 304 and coil assembly 306 produce an intrinsic damping and the temperature-sensitive device 320 produces an additional damping that is selected to counterbalance the intrinsic damping to obtain a compensated damping (1000) that reduces effects of a changing magnetic field (600) so that a phase of a recorded seismic signal is compensated for temperature-induced magnetic field changes.

In other words, the resulting damping in curve 1000 for the geophone of FIG. 3 does not change (or changes minimally) over the temperature range T1 to T2. This is different from the resulting damping in curve 800 for the geophone of FIG. 2. The goal for determining the resistance versus temperature shape of curve 900 is to apply the resistance versus damping characteristics shown in the shape of curve 500 to the uncompensated damping versus temperature shape of curve 800, to create the compensated damping versus temperature shape of curve 1000. An effective way to determine the shape of curve 900 empirically and accommodate all temperature-sensitive characteristics is to determine the resistance needed to achieve the typical 70% damping at several different temperatures. A PTC (Positive Temperature Coefficient) thermistor or a network of PTC, NTC (Negative Temperature Coefficient) thermistor and a fixed resistor can generally create the shape of curve 900 to one sufficiently skilled in the art. Note that in practice, curve 1000 may not be exactly flat. However, as long as the damping stays significantly closer to the typically desired 70% than the uncompensated damping in curve 800 of traditional devices, the geophone with such a temperature-sensitive device better describes the actual phase of the seismic wave.

Figure 10:
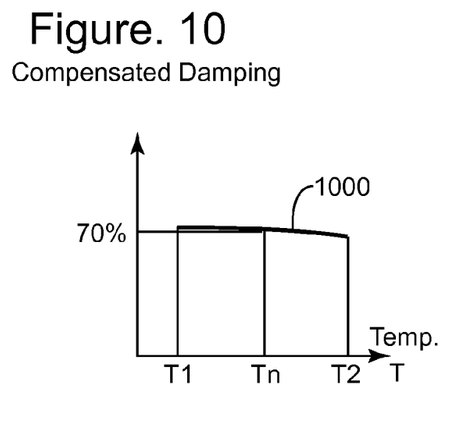
FIG. 10 is a graph illustrating the reduced change in damping using the temperature-sensitive device induced damping according to an embodiment.

In one embodiment, the temperature-sensitive device 320 may achieve curve 1000 by using a thermistor or a combination of thermistors. The thermistor or network of thermistors is a preferred embodiment because of their low cost. However, other temperature-sensitive devices may be used. A thermistor is a resistor whose resistance varies more than a conventional resistor with the ambient temperature and in a predictable manner.

By using a single thermistor or by combining a given number of thermistors and fixed resistors, it is possible to achieve damping having a desired shape, for example, the shape of curve 1000 in FIG. 10. Thus, it is possible to use a single thermistor or a plurality of thermistors (grouped in series, parallel, or combinations of series and parallel) for achieving a desired temperature-sensitive device. The choice of thermistors depends upon the actual shape of curves 500 and 800 for a specific geophone. In one application, it is possible to combine one or more fixed resistors with one or more thermistors to realize the temperature-sensitive device. Other electrical components may be added as will be recognized by those skilled in the art. In another application, not all the geophones are provided with the temperature-sensitive device 320. For example, it is possible for a fraction of the total geophones to be used for a seismic survey to be fitted with the temperature-sensitive device.

According to another embodiment, instead of compensating for the change in the magnetic field with a temperature-sensitive device so that a more accurate phase of the recorded signal is achieved, it is possible to record the signal with the incorrect phase and then to mathematically correct the phase. In other words, it is possible to implement a temperature correction algorithm that adjusts the phase after it was recorded to take into consideration the geophone's changed magnetic field due to the ambient temperature as long as the actual temperature is known and the temperature characteristics of each geophone are known.

Such a temperature correction algorithm may be implemented at different levels in the seismic survey system. According to an embodiment shown in FIG. 11, a seismic survey system 1100 may include a central control unit 1102 that communicates with a harvester unit 1104. Harvester unit 1104 (which may be located on a truck, boat, airplane, etc.) may interact with remote acquisition units 1106 or with wireless seismic sensors 1108. Remote acquisition units 1106 may communicate with one or more corresponding seismic sensors 1112 for collecting the recorded seismic data. If harvester unit 1104 is not present, one or more base stations 1110 may be used to collect seismic data from individual seismic sensors 1112 and to transmit it to central control unit 1102.

Figure 12:
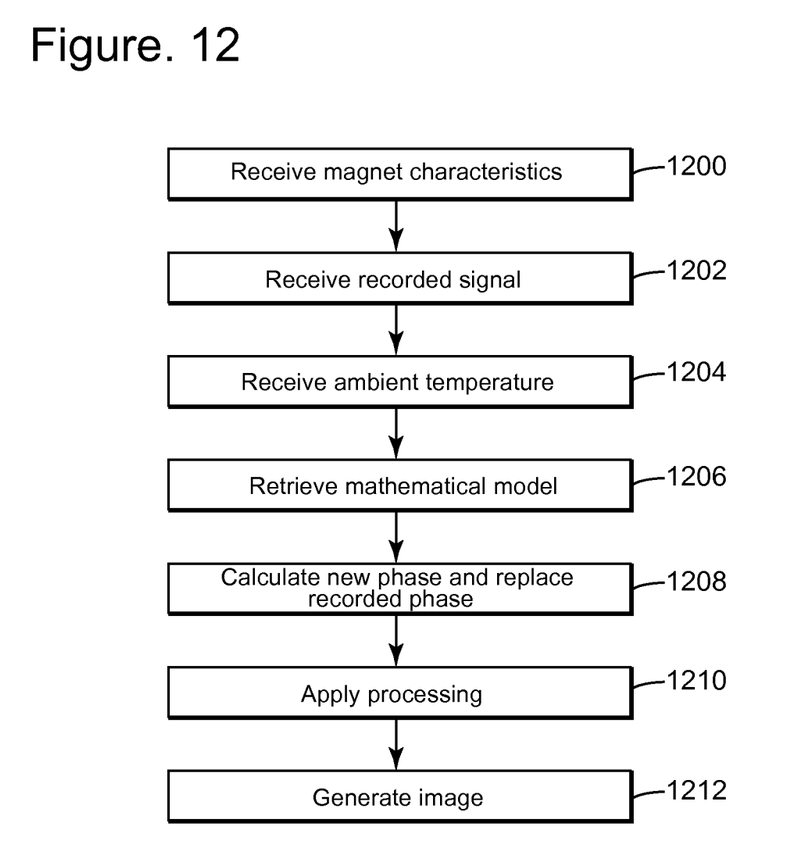
FIG. 12 is a flowchart of a possible method for correcting a recorded phase when a temperature-variable resistor is not used according to an embodiment.

The temperature correction algorithm may reside in a memory associated with a processor (to be discussed later) and may perform the following calculations. In step 1200, as illustrated in FIG. 12, the processor may receive characteristics of the magnet associated with a given geophone. In step 1202, the processor receives the signal recorded by the geophone, and in step 1204 it also receives the ambient temperature corresponding to the recorded signal. Based on a mathematical model retrieved in step 1206, the processor calculates in step 1208 a new phase for the recorded signal and replaces the recorded phase with the new phase. This calculation step may involve calculating or predicting a change in the magnetic field for the detected temperature change, and the modified recorded signal is then used, for further processing (e.g., stacking the seismic signals with the new phases) in step 1210, and for generating an image of the surveyed surface in step 1212.

Returning to FIG. 11, note that modern geophones 1112 have a digital seismic unit (1112a and 1108a), and this unit may have the capability to run the temperature correction algorithm discussed with regard to FIG. 12. Not all the seismic sensors need to run the temperature correction algorithm. Alternatively, remote acquisition units 1106 and/or base stations 1110 have a corresponding processor 1120 that can also run the temperature correction algorithm. In another application, the temperature correction algorithm may be implemented in the harvester unit 1104 or in the central control unit 1102. The ambient temperature measurement may take place at the sensor level or at the base station or remote acquisition unit level if the spread of sensors is at the same temperature. In one application, the temperature correction algorithm is performed at the base station or remote acquisition unit or central control unit while the temperature is measured at the sensor level. However, in another application, both the temperature correction algorithm and the temperature measurement are performed at the same level, i.e., at the seismic sensor, base station or remote acquisition unit. Thus, irrespective of whether the temperature correction algorithm is run at the seismic sensor level, or the base station level, or the remote acquisition unit level or at the central control unit level, it is possible to correct the phase of the recorded signal through software instead of adding hardware components (e.g., temperature-sensitive devices).

However, if this last implementation is selected, the processor that runs the temperature correction algorithm needs to receive the ambient temperature of the sensor. There are various approaches to measure the ambient temperature. For simplicity, only two such approaches are discussed next. One approach will be to have a temperature sensor installed on the seismic sensor. Not all the seismic sensors need to have a temperature sensor. However, the more seismic sensors that have the temperature sensors, the better the quality of the overall recorded seismic data.

Figure 11:
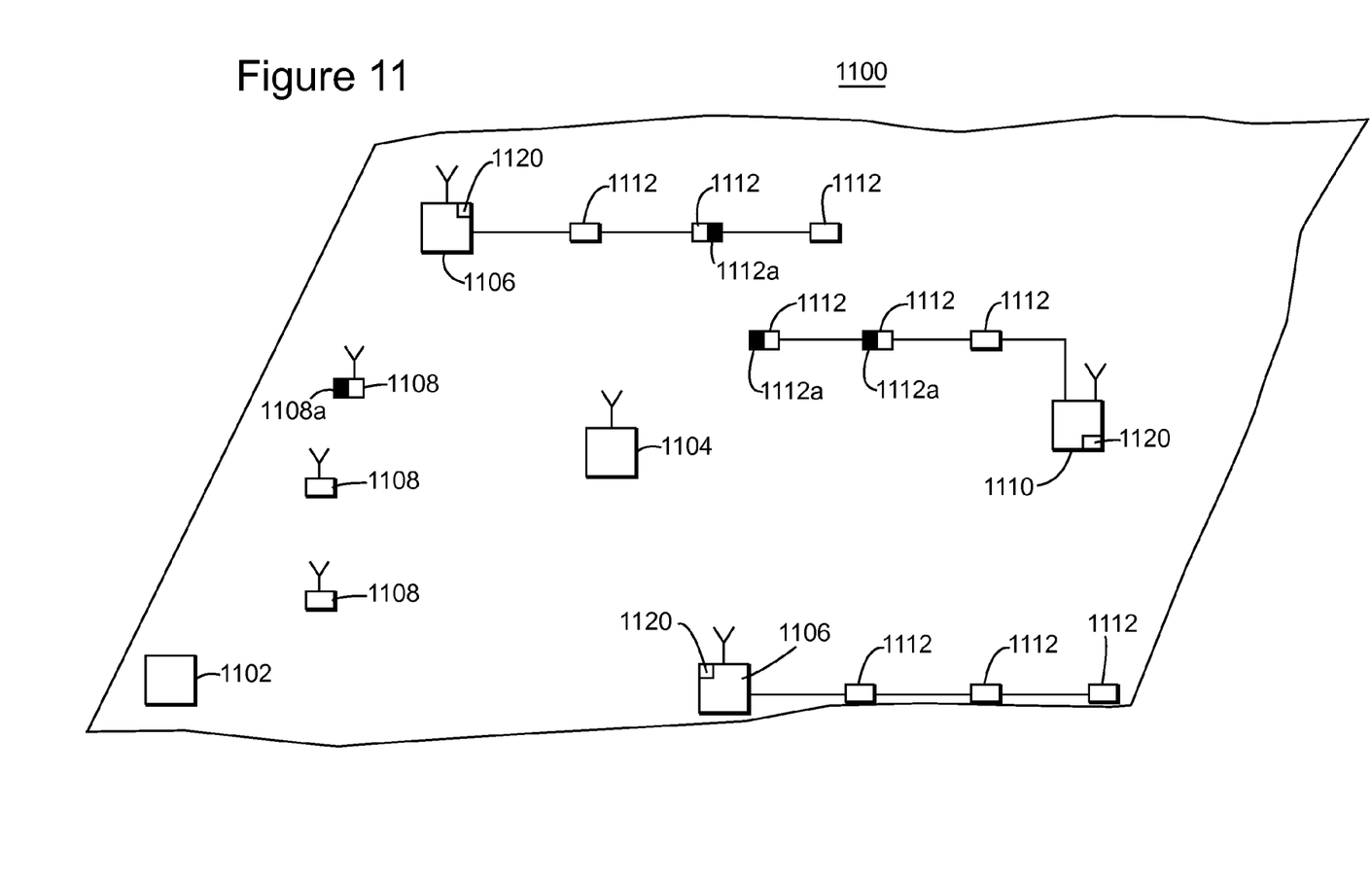
FIG. 11 is a possible seismic system that corrects a phase of a recorded seismic signal for temperature-induced phase changes according to an embodiment.

In another embodiment, temperature sensors are installed on the remote acquisition units 1106 and/or on the base stations 1110. In another embodiment, the resistivity vs. temperature characteristic graph of the resistor 208 (which is well-known for a given resistor and may be stored in the memory of the processor) may be used to determine the ambient temperature by actually measuring the resistivity of the resistor and using the above graph to calculate the temperature. This last approach may also be implemented at the base station and/or the remote acquisition units. Thus, for this approach, no independent temperature sensor is needed because the temperature-sensitive damping resistor may be used to measure the temperature.

One advantage of the novel embodiments discussed above is that inexpensive magnets may be used for the seismic sensors. While expensive magnets may be designed to have a near-constant electromagnetic damping, the above-discussed embodiments provide a different way for achieving electromagnetic damping, which is inexpensive and easy to implement. Also, the novel embodiments allow existing seismic sensors to be software-updated to implement the temperature correction algorithm with minimum disruption.

Figure 13:
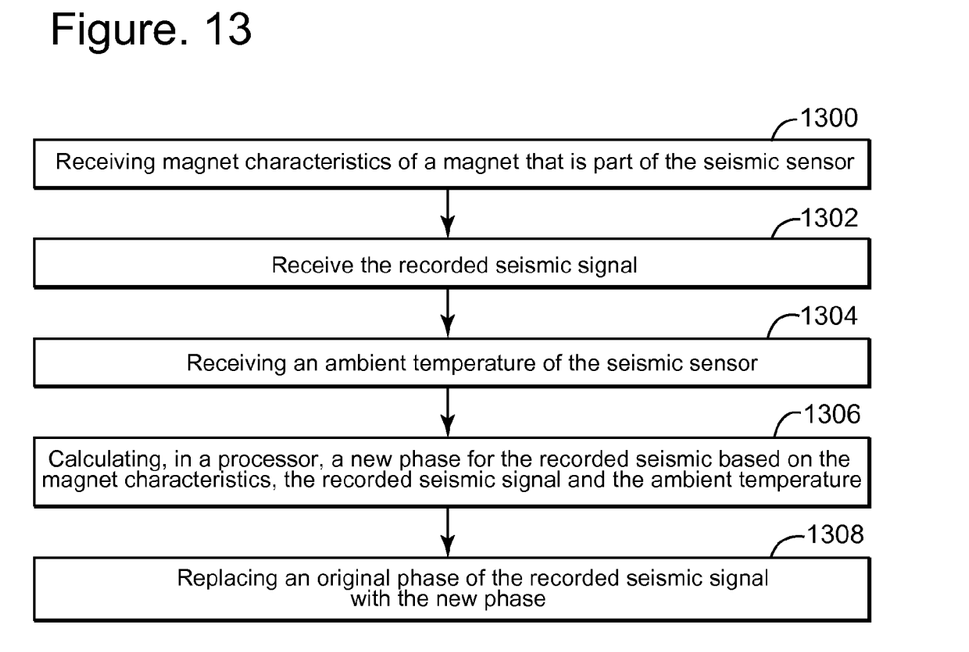
FIG. 13 is a flowchart of a possible method for calculating a new phase based on a processing algorithm according to an embodiment.

According to an exemplary embodiment illustrated in FIG. 13, there is a method for adjusting a phase of a seismic signal recorded with a seismic sensor. The method includes a step 1300 of receiving magnet characteristics of a magnet that is part of the seismic sensor; a step 1302 of receiving the recorded seismic signal; a step 1304 of receiving an ambient temperature of the seismic sensor; a step 1306 of calculating, in a processor, a new phase for the recorded seismic sensor based on the magnet characteristics, the recorded seismic signal and the ambient temperature; and a step 1308 of correcting the original phase of the recorded seismic signal with the new phase.

Figure 14:
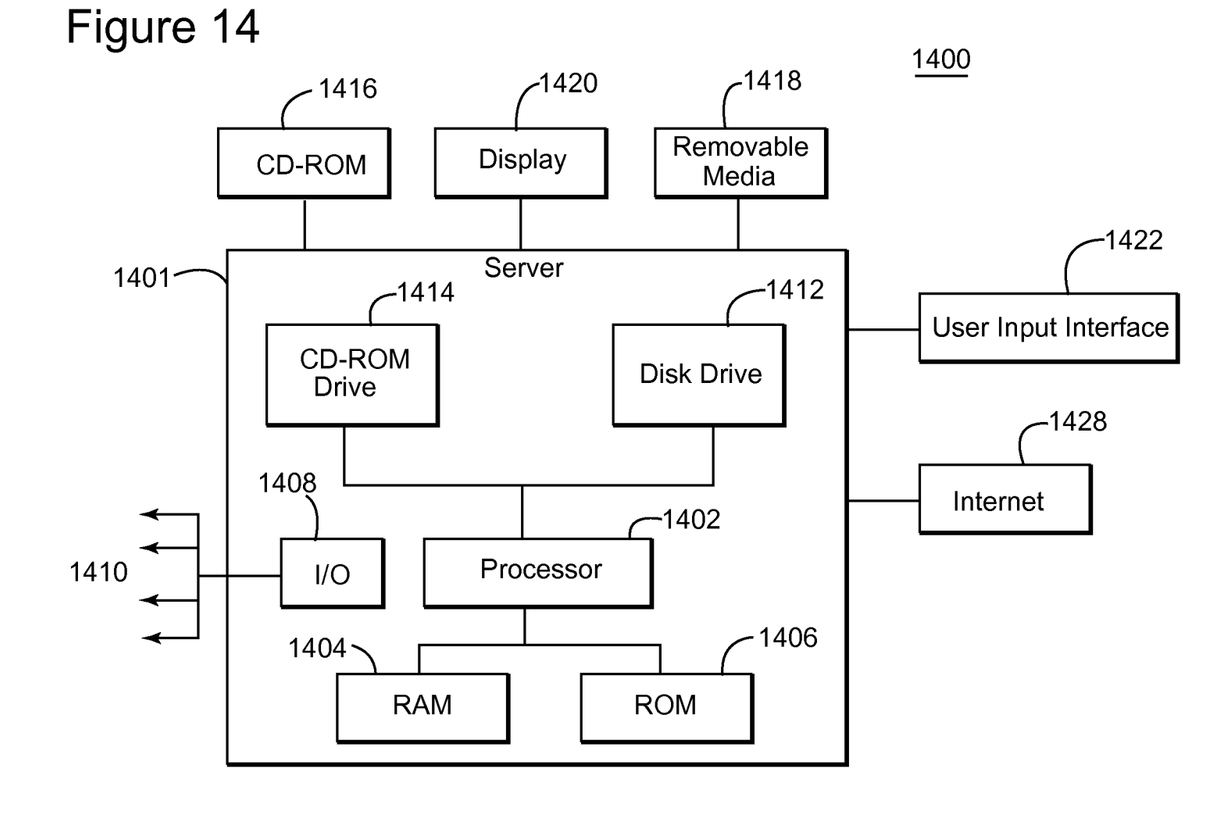
FIG. 14 is a schematic diagram of a possible computing device according to an exemplary embodiment.

The above method and others may be implemented in a computing system specifically configured to receive and/or process the data from the seismic sensor. An example of a representative computing system capable of carrying out operations in accordance with the exemplary embodiments is illustrated in FIG. 14. Hardware, firmware, software or a combination thereof may be used to perform the various steps and operations described herein. The computing system may be part of the seismic sensor 1112, or 1108, or remote acquisition unit 1106, or base station 1110, or harvester unit 1104, or it may be part of the central unit 1102.

The exemplary computing system 1400 suitable for performing the activities described in the exemplary embodiments may include server 1401. Such a server 1401 may include a central processor (CPU) 1402 coupled to a random access memory (RAM) 1404 and to a read-only memory (ROM) 1406. The ROM 1406 may also be other types of storage media to store programs, such as programmable ROM (PROM), erasable PROM (EPROM), etc. The processor 1402 may communicate with other internal and external components through input/output (I/O) circuitry 1408 and bussing 1410 to provide control signals and the like. The processor 1402 carries out a variety of functions as are known in the art, as dictated by software and/or firmware instructions.

The server 1401 may also include one or more data storage devices, including a hard drive 1412, CD-ROM drives 1414, and other hardware capable of reading and/or storing information such as DVD, etc. In one embodiment, software for carrying out the above-discussed steps may be stored and distributed on a CD-ROM 1416, removable memory device 1418 or other form of media capable of portably storing information. These storage media may be inserted into, and read by, devices such as the CD-ROM drive 1414, the disk drive 1412, etc. The server 1401 may be coupled to a display 1420, which may be any type of known display or presentation screen, such as LCD, LED displays, plasma display, cathode ray tubes (CRT), etc. A user input interface 1422 is provided, including one or more user interface mechanisms such as a mouse, keyboard, microphone, touch pad, touch screen, voice-recognition system, etc.

The server 1401 may be coupled to other computing devices, such as a landline and/or wireless terminals via a network. The server may be part of a larger network configuration as in a global area network (GAN) such as the Internet 1428, which allows ultimate connection to various landline and/or mobile client devices. The computing device may be implemented on a vehicle that performs a land seismic survey.

The disclosed exemplary embodiments provide a system and a method for compensating temperature-induced magnetic field changes in a seismic sensor. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic sensor for detecting a characteristic of a medium during a seismic survey, the seismic sensor comprising:
a casing;
a magnet located inside the casing;
a coil assembly located inside the casing, wherein the coil assembly moves relative to the magnet; and
a temperature-sensitive device connected to terminals of the coil assembly,
wherein the magnet and the coil assembly produce a temperature-sensitive intrinsic damping and the temperature-sensitive device produces an additional damping that is selected to counterbalance the temperature-sensitive intrinsic damping to obtain a compensated damping that reduces effects of a changing magnetic field so that a phase of a recorded seismic signal is compensated for temperature-induced magnetic field changes, and
wherein the additional damping varies with temperature.

2. The seismic sensor of claim 1, wherein the compensated damping that is a sum of the temperature-sensitive intrinsic damping and the additional damping of the temperature-sensitive device is about constant over a given range of temperatures.

3. The seismic sensor of claim 1, wherein the magnet generates a magnetic field that changes with temperature.

4. The seismic sensor of claim 1, wherein the temperature-sensitive device includes a thermistor.

5. The seismic sensor of claim 1, wherein the temperature-sensitive device includes a thermistor and a resistor.

6. The seismic sensor of claim 1, wherein the temperature-sensitive device includes a plurality of thermistors and fixed resistors.

7. The seismic sensor of claim 1, wherein the compensated damping is selected to have a predetermined value at a nominal temperature.

8. The seismic sensor of claim 7, wherein the predetermined value of damping is 70%.

9. The seismic sensor of claim 1, wherein the seismic sensor is a geophone.

10. A method for detecting a characteristic of a medium during a seismic survey, the method comprising:
placing a seismic sensor on ground, wherein the seismic sensor includes a casing, a magnet located inside the casing, a coil assembly located inside the casing, wherein the coil assembly moves relative to the magnet, and a temperature-sensitive device is connected to terminals of the coil assembly;
measuring with the seismic sensor a seismic signal;
generating with the magnet and the coil assembly an intrinsic damping; and
generating with the temperature-sensitive device an additional damping that together with the intrinsic damping form a compensated damping so that a phase of a recorded seismic signal is compensated for temperature-induced magnetic field changes,
wherein the additional damping varies with temperature.

* * * * *